United States Patent Office 3,222,185
Patented Dec. 7, 1965

3,222,185
FOOD MIXES WITH LOWER ALKYL DERIVATIVES OF GUAR GUM INCORPORATED THEREIN
Mao H. Yueh, Minneapolis, Minn., assignor to The Pillsbury Company, Minneapolis, Minn., a corporation of Delaware
No Drawing. Filed June 18, 1963, Ser. No. 288,616
17 Claims. (Cl. 99—94)

This invention relates generally to improvements in food mixes and more particularly to cake mixes improved by incorporation therein of certain derivatives of guar gum.

Hydrophilic colloids have been advantageously used as food mix additives for some time. For example, the use of such materials as algin, gum tragacanth, locust bean gum, gelatin, and cellulose ethers such as methyl and carboxymethyl cellulose and salts thereof have been used as baking and other food mix additives in the past.

Because of its read availability and its relatively low cost, one of the potentially most attractive of such materials for use in food mixes is guar gum. Unfortunately, however, guar gum has proved to be unsatisfactory in baking mixes, especially in cake mixes. The main deficiency of guar gum resides in its lack of tolerance to variations in the parameters of mix manufacture and in the baking of finished cakes from the resulting mix.

For example, concentration is important in the use of any material as a mix additive in that if the concentration varies too much from the optimum value for a given material, undesirable effects will be observed in the final baked product. The tolerance of guar gum to variations in concentration is much less than manifested by other gums; that is to say, at a given concentration deviation from the optimum concentration, guar gum will produce a defect of greater magnitude than would be produced by conventional gums at the same percentage deviation. Deviations from the optimum mixing time prescribed for a given cake mix; deviations from the prescribed amount of water used in preparing batter from a cake mix; and deviations from the optimum baking time of a batter produced from a cake mix are additional examples in which undesirable effects may be manifested in the final baked product.

The tolerance of guar gum is deficient with respect to all of the parameters mentioned above. This deficiency is manifested in cake mixes by lateral striation which varies in severity from mere objectional appearance in its mild form to intolerably insufficient cake heights and volumes in its most severe form.

As a result, as noted above, guar gum has, heretofore, been disadvantageous for use as a baking mix industry and has, therefore, found little acceptance in the industry. Such materials as the sodium salt of carboxymethyl cellulose have become standard additives even though their cost is considerably higher than that of guar gum.

It is, therefore, the general object of the present invention to provide techniques which would allow the utilization of guar gum as a food mix additive.

It is a further object of the invention to provide cake mixes having superior performance characteristics than mixes of the prior art.

In accordance with the present invention the above objects are attained by incorporating in a mix at least one of the derivatives of guar gum selected from the group consisting of the hydroxy and salts of carboxy alkyls. Surprisingly, as will be illustrated hereinafter, these derivatives are not characterized by the deficiencies of the parent compound; that is to say, the derivatives are more tolerant to deviations from optimum mix manufacture and baking parameters than is the parent compound.

More surprisingly, these compounds produce baking mixes which are superior to mixes produced heretofore by the use of conventional additives.

The additives of the present invention may suitably be incorporated in food and baking mixes of all types. Examples of such mixes include cake mixes, pancake mixes, bread mixes and frosting mixes. The most striking improvements of the guar derivatives over the parent compound and over conventional additives of the prior art will, however, be found in connection with their use in cake mixes.

The derivatives may be incorporated into the mixes in any convenient manner. One suitable method is blending in the dry state.

The concentrations at which the additives of the invention should be present in baking mixes is in general similar to the additives of the prior art. Suitable concentrations range from 0.01 to 2 percent by weight within which 0.1 to 0.5 is a preferred range for most mixes. Within this range of concentration, 0.2 percent is preferred for cake mixes, 0.25 is preferred for frosting mixes and 0.2 percent is preferred for pancake and bread mixes.

Since guar gum has on the average three free hydroxy groups in each monomeric unit in its polymeric chain, the degree of substitution can vary between 0 and 3. Although performance of the derivative in making mixes will vary with respect to the degree to which guar gum is substituted, the degree of substitution is not critical. For use in most baking mixes, however, it is preferred that the degree of substitution be maintained between about 0.4 and about 1.3 with 0.7 being the preferred degree for cake mixes.

Although any hydroxy or carboxy derivative of guar gum will function as a baking mix additive and is, therefore, within the scope of the present invention, as a practical matter only the lower alkyls (i.e., through butyl) are presently of significant interest. Of these materials, the carboxymethyl and hydroxyethyl are preferred and as between these two materials, the carboxymethyl derivative is preferred.

The derivatives of the present invention may be prepared by techniques well-known to the art. For example, the carboxymethyl derivative may be suitably prepared by dispersing guar gum in an ice cold 45% solution of sodium hydroxide at a gum concentration of approximately 30 grams per 100 ml. of base. The thus dispersed gum is allowed to stand for approximately 30 minutes under ice cold temperature conditions after which there is slowly added with stirring a freshly prepared aqueous 75% solution of chloroacetic acid. Approximately 40 ml. of chloroacetic acid solution is added for each 100 ml. of NaOH-guar gum solution. The temperature of the resulting mixture is then raised approximately to 75° C. and the mixture allowed to react for about 30 minutes. The reaction mixture, which is in a gelled state, is then cooled, subdivided, and neutralized with acetic acid. The product is precipitated and washed with methanol until the methanol wash solution is colorless. The product is then dried and ground to a powder form. This same technique can be used, with variations which will be apparent to those skilled in the art, to prepare other alkyl derivatives such as the ethyl and propyl varieties by substituting the appropriate halo alkyl acid for chloroacetic acid.

The hydroxyalkyl derivatives, such as hydroxy ethyl guar gum, may be prepared by dispersing guar gum in a sodium hydroxide as prescribed above for carboxymethylation, after which the temperature is raised to 50° C. and one part chloroethanol for each part of guar solution is added with stirring. After about one hour the reaction mixture is neutralized, the modified gum separated by alcohol precipitation and then washed and purified with methanol, dried and ground to a suitable particle size range.

To facilitate a more complete understanding of the invention, the following illustrative examples are offered:

Example 1

An experiment was performed to determine the tolerance to deviations in mixing time of a typical yellow cake mix containing (a) no additive; (b) 0.2% carboxymethyl cellulose; (c) 0.2% carboxymethyl guar gum; (d) hydroxyethyl guar gum; and (e) 0.2% unmodified guar gum. The basic cake formula used contained:

| | Parts |
|---|---|
| Sugar (sucrose) | 41.15 |
| Flour | 38.95 |
| Dextrose | 4.00 |
| Non-fat dry milk solids | 1.00 |
| Salt | 0.85 |
| Leavening | 2.35 |
| Artificial color | 1.00 |
| Vanilla flavoring | 0.50 |
| Shortening | 10.00 |

To the above basic mix, 0.2 part of the appropriate hydrophilic colloid is added to make mixes (b), (c), (d) and (e) noted above.

Batters were made from the above mixes by adding 50 grams of liquid whole egg and 188 ml. water to 276 grams of dry mix, blending with a typical home mixer at low speed for one minute followed by high speed mixing for times of 1, 3, 5 and 7 minutes. The amounts of water used (188 ml.) was 19 percent greater than optimum to accentuate the effect of variations in mixing time. All cakes were baked for 25–30 minutes at 375° F.

The table below is a summary of the results of the baking tests, the letters A through E being quality grades. A indicates a cake having no detectable deficiencies, E indicates an unacceptable cake, and the intermediate letters cakes having deficiencies of increasing magnitude. Where two letters are used, the quality was judged as being between the two quality levels.

| Mixing Time | Mix (a) No Additive | Mix (b) 0.2% CMC Added | Mix (c) 0.2% CMG Added | Mix (d) 0.2% HEG Added | Mix (e) 0.2 Unmodified Guar Gum |
|---|---|---|---|---|---|
| 1 min | E | C–D | B | C | C–D |
| 3 min | E | C | A | B–C | C |
| 5 min | D | D | B | B–C | C |
| 7 min | D | D | D | B–C | C |

Example 2

Using the basic yellow cake formula set forth in Example 1, various amounts of unmodified guar gum and modified guar gum were added to determine the effect of variations in concentration on mix performance. Additive concentration levels were 0.2 weight percent, 0.4%, 0.6%, 0.8% and 1.0%, of which 0.2 was deemed optimum. In cakes baked from unmodified guar gum, lateral striation (i.e., a horizontally extended grain structure) appeared at concentrations at 0.6%, whereas with both carboxymethyl and hydroxyethyl guar gums, the cake structure was homogeneous at all concentrations.

In a variation of this experiment, the additives at the above concentrations were fully hydrated before being added to the basic dry mix in order to eliminate any variations which might be caused by differences in mixing times. Mixes containing unmodified guar gum produced totally unacceptable cakes at all concentrations, whereas carboxymethyl guar gum produced acceptable cakes at concentrations ranging from 0.2% to 1.0%.

Example 3

Batters were prepared from the basic mix described in Example 1. Batter A contained no additive, batter B contained 0.2% hydroxyethyl guar gum; batter C contained 0.2% carboxymethyl guar gum, batter D contained 0.2% carboxymethyl cellulose, and batter E contained unmodified guar gum. All five batters contained an excess of 19% water to accentuate differences, as in Example 1, and all five were blended and mixed for optimum results. After mixing, however, the batters were allowed to stand for various lengths of time before baking in order to simulate unavoidable delays in baking that might be encountered by the housewife. The table below is a summary of the results. The A through E quality scoring system described in Example 1 was used to evaluate the cakes.

| | Time (minutes) | | | | | |
|---|---|---|---|---|---|---|
| | 0 | 5 | 10 | 15 | 20 | 30 |
| Batter A | E | (*) | | | | |
| Batter B | A–B | B | B | B | C | E |
| Batter C | A–B | A | A | A | A | B |
| Batter D | A–B | B | B | C | C | C |
| Batter E | B | B | B | B–C | C | C |

*This experiment was not continued because experience shows that increased standing time cannot improve cake performance.

Example 4

Using the basic formula set forth in Example 1, modified by using as additives 0.2% each of (a) carboxymethyl cellulose, (b) carboxymethyl guar gum, (c) hydroxyethyl guar gum, and (d) unmodified guar gum. Cakes were baked from these mixes for 25 minutes, 35 minutes, and 40 minutes, 30–35 minutes being the prescribed optimum time for a recipe of this type. The cakes utilizing the guar gum derivatives were acceptable at all three baking times. The table below is a summary of the results using the quality scoring system described above.

| | Baking Time | | |
|---|---|---|---|
| | 25 min. | 35 min. | 40 min. |
| Cake (a) | E | A | A |
| Cake (b) | A | A | A |
| Cake (c) | A | A | A |
| Cake (d) | B | A | A |

Example 5

A basic frosting mix containing the following ingredients was prepared:

| | Parts |
|---|---|
| Sugar | 74.90 |
| Dextrose | 17.80 |
| Egg albumen | 2.50 |
| Starch | 2.20 |
| Leavening | 0.50 |
| Salt | 0.50 |
| Flavoring | 1.00 |
| Gelatin | 0.35 |

To the above basic mix unmodified guar gum, carboxymethyl guar gum, and hydroxymethyl guar gum were added at a concentration of 0.25 percent by weight. Frostings were prepared from all three mixes and evaluated. Unmodified guar gum produced an unacceptable product characterized by objectionable flavor and odor, whereas the guar derivatives were free from detectable deficiencies.

Example 6

Two batters were prepared from the basic dry mix of Example 1, one having 0.2% carboxymethyl cellulose and the other 0.2% carboxymethyl guar gum added. In each case fifty grams of liquid whole egg, and 158 ml. water were blended into the mix at low speed for one minute, after which the batter was mixed at high speed for two minutes. The cakes were baked at 350° F. for 30–35 minutes. The cakes containing carboxymethyl guar gum exhibited a greater volume and finer texture than the cake containing carboxymethyl cellulose. Additionally, in organoleptic testing the carboxymethyl guar gum cake exhibited greater moisture than did the cake containing carboxymethyl cellulose.

From the above, it can be seen that the hydroxyalkyl and carboxyalkyl derivatives not only eliminate the heretofore insurmountable disadvantages of guar gum, but additionally provides additives which are superior to the best now available. It should be stressed that the above examples are illustrative only and are not to be interpreted in a limiting sense. Rather, the scope of the invention should be limited only by the following claims.

What is claimed is:

1. In a food mix formed predominately from a carbohydrate material, the improvement characterized by the incorporation in said mix of a hydrophilic colloid as an additive comprising an effective amount of at least one guar gum derivative selected from the group consisting of hydroxyloweralkyl and salts of carboxyloweralkyl guar gums to improve the baking qualities and tolerance to variations in mix manufacture.

2. In a baking mix comprising flour, sugar, shortening, the improvement characterized by the incorporation in said mix of a hydrophilic colloid as an additive to improve mix performance comprising an effective amount of at least one guar gum derivative selected from the group consisting of hydroxyloweralkyl and salts of carboxyloweralkyl guar gums to improve the baking qualities and tolerance to variations in mix manufacture.

3. The improvement of claim 2 in which said baking mix is a cake mix.

4. The improvement of claim 3 wherein said guar gum derivative is a carboxyalkyl derivative.

5. The improvement of claim 3 wherein said guar gum derivative is a hydroxyalkyl derivative.

6. The improvement of claim 4 wherein said derivative is a salt of carboxymethyl guar gum.

7. The improvement of claim 5 wherein said derivative is hydroxyethyl guar gum.

8. The improvement of claim 6 wherein the concentration of said salt of carboxymethyl guar gum is within the range of 0.01 to 2 percent by weight.

9. The improvement of claim 7 in which the concentration of said hydroxyethyl guar gum is within the range of 0.01 to 2 percent by weight.

10. The improvement of claim 8 in which the degree of substitution of said carboxymethyl guar gum is within the range of 0.4 to 1.3.

11. The improvement of claim 10 in which the degree of substitution of said carboxymethyl guar gum is approximately 0.7 and the concentration in said baking mix is approximately 0.2 percent by weight.

12. In a frosting mix formed predominately from a carbohydrate material, the improvement characterized by the incorporation in said mix of a hydrophilic colloid as an additive comprising an effective amount of at least one guar gum derivative selected from the group consisting of hydroxyloweralkyl and salts of carboxyloweralkyl guar gums.

13. In a food mix formed predominately from a pulverulent carbohydrate material and containing as an additive a minor amount of hydrophilic colloid material, the improvement of incorporating as said hydrophilic colloid an effective amount of at least one guar gum derivative selected from the group consisting of hydroxy lower alkyl and the salts of carboxyl lower alkyl guar gums to improve the baking qualities and tolerance to variations in mix manufacture.

14. In a food mix formed predominately from a pulverulent carbohydrate material and containing as an additive comprising not more than about 0.5 percent by weight of a hydrophilic colloid, the improvement of incorporating as said hydrophilic colloid an effective amount of at least one guar gum derivative selected from the group consisting of a hydroxy lower alkyl and salts of carboxy lower alkyl guar gums to improve the baking qualities and tolerance to variations in mix manufacture.

15. In a food mix formed predominately from a pulverulent carbohydrate material and containing as an additive comprising not more than about 0.5 percent by weight of a hydrophilic colloid, the improvement of incorporating as said hydrophilic colloid an effective amount of at least one guar gum derivative selected from the group consisting of hydroxy lower alkyl and salts of carboxy lower alkyl guar gums having a degree of substitution between about 0.4 to 1.3 to improve the baking qualities and tolerance to variations in mix manufacture.

16. In a food mix formed predominately from a pulverulent carbohydrate material and containing as an additive comprising not more than about 0.5 percent by weight of hydrophilic colloid, the improvement of incorporating as said hydrophilic colloid an effective amount of hydroxyethyl guar gum to improve the baking qualities and tolerance to variations in mix manufacture.

17. In a food mix formed predominately from a pulverulent carbohydrate material and containing as an additive comprising not more than about 0.5 percent by weight of hydrophilic colloid, the improvement of incorporating as said hydrophilic colloid an effective amount of carboxymethyl guar gum to improve the baking qualities and tolerance to variations in mix manufacture.

References Cited by the Examiner
UNITED STATES PATENTS

| | | | |
|---|---|---|---|
| 2,477,544 | 6/1949 | Moe | 260—209 |
| 2,983,617 | 5/1961 | Block | 99—139 |
| 3,009,812 | 11/1961 | Ganz | 99—139 |
| 3,071,472 | 1/1963 | Hager et al. | 99—94 |

A. LOUIS MONACELL, *Primary Examiner.*

RAYMOND N. JONES, *Examiner.*